US012750559B1

(12) United States Patent
Jain et al.

(10) Patent No.: US 12,750,559 B1
(45) Date of Patent: Sep. 29, 2026

(54) ASSET QUALITY MANAGEMENT USING MULTIMODALITY

(71) Applicant: ROKU, INC., San Jose, CA (US)

(72) Inventors: Atishay Jain, Mountain View, CA (US); Jinesh Dineshbhai Patel, San Jose, CA (US); Fei Xiao, San Jose, CA (US); Aravindkumar Ilangovan, Freemont, CA (US); Poornima Chozhiyath Raman, San Jose, CA (US); Arpit Malhotra, San Jose, CA (US); Ajay Pande, Sunnyvale, CA (US); Abhishek Bambha, San Jose, CA (US); Ronica Jethwa, Mountain View, CA (US); Prateek Caire, Los Gatos, CA (US); Rohit Mahto, San Jose, CA (US); Pulkit Aggarwal, Santa Clara, CA (US); Ni Yan, San Francisco, CA (US); Unnikrishnan R Nair, Bangalore (IN); Nam Vo, San Jose, CA (US); Jin Bao, Short Hills, NJ (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 19/188,326

(22) Filed: Apr. 24, 2025

(51) Int. Cl.
*H04N 21/482* (2011.01)
*H04N 21/435* (2011.01)

(52) U.S. Cl.
CPC ......... *H04N 21/482* (2013.01); *H04N 21/435* (2013.01)

(58) Field of Classification Search
CPC ........................... H04N 21/482; H04N 21/435
See application file for complete search history.

(56) References Cited

U.S. PATENT DOCUMENTS

| | | | | |
|---|---|---|---|---|
| 2010/0169369 | A1* | 7/2010 | Wang | G06F 16/48 707/E17.108 |
| 2014/0288940 | A1* | 9/2014 | Grant | G10L 19/167 704/500 |
| 2019/0236090 | A1* | 8/2019 | Singh | H04N 21/2353 |
| 2020/0226493 | A1* | 7/2020 | Hari Haran | G06F 16/38 |
| 2022/0012281 | A1* | 1/2022 | Katz | G06F 16/735 |

* cited by examiner

*Primary Examiner* — Kunal Langhnoja
(74) *Attorney, Agent, or Firm* — Sterne, Kessler, Goldstein & Fox P.L.L.C.

(57) ABSTRACT

Disclosed herein are system, method, and computer program product embodiments that evaluate quality of metadata elements for use in a content selection graphical user interface. The metadata elements are processed using a deep neural network (DNN) trained to generate quality labels or scores for the metadata elements. Training metadata elements are processed using a large language model to generate asset embeddings corresponding to the training metadata elements. Similarity scores between pairs of the asset embeddings are computed. Training metadata elements having asset embeddings outside of first and second score thresholds are labeled with a first label indicative of "bad" metadata, and training metadata elements having asset embeddings between the thresholds are labeled with a second label indicative of "good" metadata. The DNN is trained to perform the generation of the quality labels or scores using supervised learning, based on the labeled training metadata elements.

20 Claims, 10 Drawing Sheets

NOVEL METADATA ELEMENT EVALUATION USING TRAINED EVALUATION DNN

DNN TRAINING QUALITY SCORE THRESHOLD SETTING USING AGENTIC AI

ASSET QUALITY MANAGEMENT USING MULTIMODALITY

BACKGROUND

Field

This disclosure is generally directed to systems for automatically evaluating and generating media content item metadata.

SUMMARY

Provided herein are system, apparatus, article of manufacture, method and/or computer program product embodiments, and/or combinations and sub-combinations thereof, for automated artificial intelligence (AI)-based evaluation of media content-related information for use in a downloadable or streaming media content item selection user interface ("menu") system.

Example method, system, and non-transitory computer-readable medium embodiments operate by evaluating content item metadata elements for use in a content selection graphical user interface. In the example embodiments, the evaluating the content item metadata elements is performed by processing the content item metadata elements using a deep neural network (DNN) trained to generate quality labels or scores for each of the content item metadata elements. The DNN is trained with a sequence of DNN training operations. A first of the DNN training operations includes processing training metadata elements using a large language model, thereby generating asset embeddings corresponding to the training metadata elements. A second of the DNN training operations includes computing similarity scores between pairs of the asset embeddings. A third of the DNN training operations includes labeling ones of the training metadata elements having asset embeddings with similarity scores less than a first score threshold or greater than a second score threshold with a first label (e.g., indicative of "bad" metadata) and ones of the training metadata elements having asset embeddings with similarity scores between the first score threshold and the second score threshold with a second label (e.g. indicative of "good" metadata). A fourth of the DNN training operations includes using supervised learning, aided by the labeled training metadata elements, to train the DNN to perform the generation of the quality labels or scores. The DNN can be trained with the same one or more computer processors used to process the content item metadata elements to evaluate them using the DNN, or can be trained with different one or more computer processors.

In some embodiments, different ones of the content item metadata elements that are of the same type and for the same content item are deduplicated. In some embodiments, the deduplication includes selecting a single one of the content item metadata elements, from among the ones of the content item metadata elements that are of the same type and for the same content item, based on the quality labels or scores generated by the DNN for the ones of the content item metadata elements that are of the same type and for the same content item. In some embodiments, the deduplication includes selecting a plurality of the content item metadata elements, from among the ones of the content item metadata elements that are of the same type and for the same content item, based on the quality labels or scores generated by the evaluation DNN for the ones of the content item metadata elements that are of the same type and for the same content item, and providing the plurality of the content item metadata elements to the large language model or another large language model with a prompt instructing merger of the plurality of the content item metadata elements into a merged content item metadata element.

In some embodiments, the deduplicating provides deduplicated content item metadata elements. The deduplicated content item metadata elements are stored and at least one of them is displayed to the content item selection graphical user interface.

In some embodiments, electronic notice is automatically provided to a content item metadata provider rejecting one or more of the content item metadata elements having quality labels or scores indicative of unacceptable quality.

In some embodiments, at least one of the first score threshold or the second score threshold is determined by an agentic artificial intelligence configured to analyze metadata element evaluation output of the evaluation and to adjust the first score threshold or the second score threshold based on the analyzing the metadata evaluation output.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
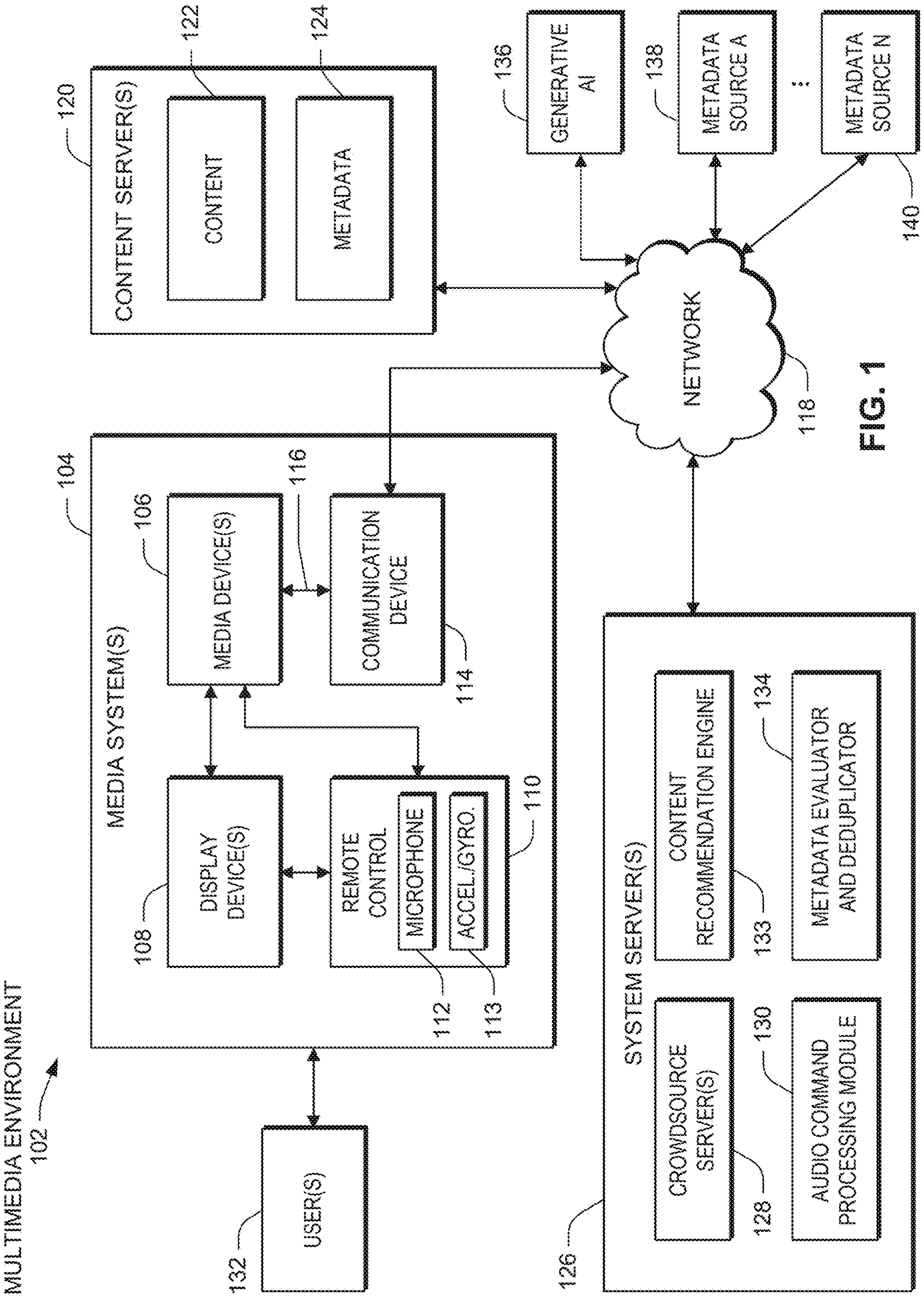
FIG. 1 illustrates a block diagram of a multimedia environment, according to some embodiments.

Provided herein are system, apparatus, device, method and/or computer program product embodiments, and/or combinations and sub-combinations thereof, for making automated quality assessments of content-related information using generative AI and machine learning (ML). Associated systems, methods, and computer-readable media embodiments for training a neural network are also described. Associated systems, methods, and computer-readable media embodiments for performing other asset quality management functions, such as deduplication and automated rejection notification, as also described.

As streaming and downloadable content delivery services continue to supplant traditional media distribution systems such as terrestrial broadcast television, cable television, and theatrical distribution of cinematic products, media content selection user interfaces have become a field of technology unto themselves. Improving user experiences and efficiency of user interaction via technological innovation to media content selection user interfaces provides distinguishing benefits and advantages that drive user adoption of, and fidelity to, a given content delivery service.

A content delivery service can provide streaming or downloadable media content to users. The content can include, as examples, movies, television shows, live streams for such programming as news or sporting events, interactive games or other software applications, audio (e.g., songs, albums, audiobooks), still images, and textual content. The content delivery service can provide a user interface, such as a graphical user interface (GUI), as a content item selection user interface, or menu, that can display selectable content items and can assist a user in navigating what may be a very large library of content (e.g., including thousands or millions of choices at any given time). The selectable content items can be pre-selected and/or previewed in ways that afford varying degrees of preview of content by incorporating into the user interface images (e.g., still or animated thumbnail images) and/or video clips representative of the selectable content items available to a user. The varying degrees of preview can provide a hierarchy of preview information volume, variety, and/or density that can assist a user in selecting a content item for consumption by progressively gauging or building interest until a user selects the content item.

Selectable content items displayed in selection user interface can also include or show metadata (e.g., textual metadata, pictorial metadata, video metadata, and/or animated pictorial metadata) associated with the corresponding content. The textual metadata can include, as examples, a title, a description (e.g., plot summary), a short-form description ("micro-descriptor"), year(s) of release or publication, number of seasons (and/or episodes, chapters, and/or parts), genre, runtime length, names of associated creators or companies (e.g., one or more directors, featured performers, producers, or production companies), audience ratings (e.g., a score out of five or ten), content ratings (e.g., G, PG, PG-13, R, E, T, M, AO, etc.), content warnings (e.g., adult language, nudity, violence, smoking), a trailer, asset artwork (e.g., a still image signifying the content item, such as artwork from a theatrical movie poster or home video packaging), subtitles, metrics of content item quality (e.g., video quality and/or audio quality), and/or amount of runtime remaining for a user who may have begun consuming the content but who has yet to complete consuming the content. Depending on the design of the media content selection user interface and the position of a user within a pre-selection or preview hierarchy provided by the user interface, different portions or aspects of the content-item-related information (content item metadata) can be displayed by the user interface to provide the varying volume, variety, and/or density of preview information. The quality of the content item metadata presented to a user within a content item selection user interface, or menu, can be critical to assisting a user in selection of a content item that best matches the user's interests, preferences, or present mood, and can be critical to inducing a user to select a content item.

The content item metadata can have been obtained by the content delivery service from multiple data sources. As one example, content item metadata, such as descriptions of content items (e.g., plot summaries of the content items), can have been created or generated internally by the content delivery service, and can therefore be the content delivery service's own proprietary metadata. As another example, content item metadata, such as descriptions of content items, may be provided to the content delivery service by a third party, e.g., a producer or distributor of the content, an entertainment data vendor, or one or more internet websites or their related databases. The content delivery service may source such descriptions, or other content item metadata, from a variety of sources and thus may internally possess and retain sets of literally different but substantively redundant metadata. For example, the content delivery service may obtain and retain multiple brief textual descriptions for a single content item.

Where multiple different options exist for an element of metadata, e.g., as may have been sourced from different sources, the metadata may need to be deduplicated ("deduped"). Deduplication ("deduping") of metadata involves selecting only one best or preferred option among redundant options of a metadata element for display to the content delivery service's user-facing content item selection user interface. Even where only one or a few options exist for an element of metadata, the existing option(s) may be of poor quality or may be inaccurate, and the content delivery service would prefer not to display low-quality metadata to its end users within its content item selection user interface. The content delivery service would prefer to detect such low-quality metadata and, where possible, order replacement. Given that there may be hundreds of thousands or millions of content items in the content delivery service's library, and given the plurality of different languages in which metadata may exist for each of the content items in the library, engaging human labor in metadata evaluation and deduping efforts can be inefficient or impractical. Accordingly, automated systems and methods for metadata evaluation deduping are becoming a technological field unto themselves. Improvements to such automated systems, such as those described herein, can improve metadata, such as content descriptions, chosen for display within a content item menu and can thus provide a more satisfying user interface experience, which improves the technology of media content selection user interfaces. Such systems can also eliminate or reduce human and compute resources.

Rule-based computer-implemented methods can be used to automatically evaluate and/or dedupe elements of content-item-related information, e.g., by selecting only one of the multiple brief textual descriptions to display to a user via the platform. However, rule-based methods for content-item-related information deduping may be inaccurate, e.g., in that such methods may fail to capture relevancy and semantics of associated content items, and can often require manual human intervention to address inaccuracies. Accordingly, practical automated evaluation and/or dedupe methods should rely not on rule-based methods, or not on rule-based methods alone, so as to eliminate or reduce the need for manual human intervention and reduce evaluation and/or deduping processing costs.

Available machine-learning models, such as large language models (LLMs), which can include multimodal models capable of understanding textual as well as pictorial, video, audio, and/or audiovisual content, have been trained on vast amounts of data. An LLM or other generative AI model, or connected collection of models, capable of performing content comprehension and summarization tasks, can be trained on a large corpus of data, which can include data from large, ever-evolving databases available on the internet, such as movie databases and encyclopedias. The trained LLM or other generative AI model can thus contain inbuilt knowledge that can include understandings of various aspects of a large number of content items that may be available on a platform of a content delivery service. For example, the inbuilt knowledge of a machine-learning model can include an understanding of the plot of a movie or TV show episode. Additionally, because the trained LLM or other generative AI model is trained on vast amounts of data, including publicly available data, the trained LLM or other generative AI model is less likely to be biased towards content delivery service platform user biases.

An LLM or other generative AI model can be used to directly evaluate content item metadata, for example, by providing a metadata element to the LLM and asking the LLM to score or flag the metadata element (e.g., as "good" or "bad"). However, the date at which data is harvested from a given source for the training corpus marks a training cut-off date, and the LLM or other generative AI model may have no awareness of information made available only after the relevant training cut-off date, unless such information is provided as context data in a prompt to the LLM or other generative AI model. The LLM or other generative AI model may be configured to know a single training cut-off date at which its knowledge is capped or may know different cut-off dates relevant to its different knowledge domains. Because of inbuilt-knowledge limitations related to training cutoff date, usage of an LLM or similar generative AI model to directly evaluate content item metadata may suffer in performance for new content items produced after the training cutoff date.

Alternatively, the inbuilt knowledge of one or more such LLMs or other machine-learning models can be used to create a labeled dataset of content item metadata elements that can be used to train a deep neural network (DNN) capable of evaluating metadata elements, including novel metadata elements for content items produced after an LLM's training cutoff date. For example, multimodal metadata elements (e.g., asset artwork, brief textual description, genre label, plot summary, user ratings, content ratings, title, subtitles, metrics of video quality), or a subset of such elements, can be transformed into asset embeddings in a vector space. An embedding (e.g., a vector arranged as a sequence of numbers that represent a point in a multi-dimensional space) can be used to represent the underlying meaning of an unstructured data item, such as a content item and/or its associated metadata, in a format that can be more easily understood and manipulated by computational models than could be the unstructured data itself. Machine-learning models, including LLMs, can transform unstructured inputs such as content item metadata elements into asset embeddings that can encode semantic nuances decipherable by algorithms.

The spatial orientations of different embeddings with respect to each other can signify associations or relationships between the unstructured data items that the embeddings represent. For example, the closer together that two embeddings are to each other as points in multidimensional space, the more similar their respective unstructured data items can be considered to be. Similarity scores can be computed between different embeddings, e.g., between pairs of embeddings. Examples of similarity scores can include Euclidian distances, a cosine similarities, or contextual similarity scores based on language similarity models. In some embodiments, a complete content item (e.g., a complete video file of a movie or TV series episode) can be included in the embedding transformation to enrich the feature representation.

The resultant embeddings, representative of content item metadata elements or content items themselves, can be automatically binary-labeled (e.g., as "good" or "bad") based on the similarity scores between embeddings, which can serve as a quantifier of the relevancy between an embedding of each metadata element and an embedding of a different metadata element, such as a title of the associated content item. For example, the embedding score thresholds can be set as a function of score frequency, using statistical methods, heuristic methods, or agentic AI methods to determine desirable, improved, or optimal thresholds. For example, elements of content item metadata whose corresponding embeddings have similarity scores that fall below a first (low) score threshold or above a second (high) score threshold can be labeled with a first label (e.g., "bad" or "0"), and all other content items, including those that fall between the first score threshold and the second score threshold, can be labeled with a second label (e.g., "good" or "1"). Having been so labeled, the labeled metadata elements can be used to train a DNN, using supervised learning techniques, to score or flag the quality of novel metadata elements for any new content item subsequently onboarded by the content delivery service platform.

Advanced moderation models and content filtering systems can be employed to ensure platform content safety, e.g., to keep metadata, such as content item descriptions, free from explicit language. A comprehensive list of content item metadata can be used to avoid mismatches during metadata extraction and summarization. A heuristic method can ensure reliability in metadata extraction by using the LLM or other generative AI model only for data predating the training data cutoff date by reverting to precise internal data sources under circumstances where the LLM or other generative AI model is unlikely to have been trained with information about a particular content item.

Various embodiments of this disclosure may be implemented using and/or may be part of a multimedia environment 102 shown in FIG. 1. Multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 is described below.

Example Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 can represent a system installed in a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. Terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, as examples, a cable modem or satellite TV transceiver. The media device 106 may communicate with the communication device 114 over a link 116, wherein the link 116 may include wireless (such as Wi-Fi) and/or wired connections.

In various embodiments, the network 118 can include, without limitation, wired and/or wireless intranet, extranet, internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 is configured to wirelessly communicate with the media device 106 and/or display device 108 using cellular, Bluetooth, infrared, etc., or any combination thereof. The remote control 110 may include a microphone 112, which is further described below. The remote control 110 may include one or more accelerometers and/or one or more gyroscopes 113, which can produce remote control motion data.

The multimedia environment 102 may include a plurality of content servers 120 (also called content providers, channels, or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, genre (e.g., drama, comedy, documentary), content type (e.g., TV series, movie), short (e.g., multi-sentence) description (e.g., plot summary), a micro-descriptor (e.g., a three-word-long content summary), audience rating (e.g., expressed as an integer or decimal value out of ten, a number of stars out of five, etc.), content rating (e.g., a Motion Picture Association or Entertainment Software Rating Board rating, such as G, PG, PG-13, R, E, T, M, AO, RP, UR for unrated, etc.), content warnings (e.g., adult language, nudity, violence, or smoking), runtime, chapters, production, history, release or publication year or date, trailers, asset artwork (e.g., a still image signifying the content item, such as artwork from a theatrical movie poster or home video packaging), subtitles, metrics of content item quality (e.g., video quality and/or audio quality), alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index. Metadata 124 may also include scores or flags indicative of the quality of corresponding metadata elements.

The metadata 124 may be sourced from various sources, indicated within multimedia environment 102 of FIG. 1 as metadata source A 138 through metadata source N 140. The metadata sources can be, for example, various third-party providers of media content metadata or various websites on the internet or their related databases.

The multimedia environment 102 may include one or more system servers 126. In some embodiments, the system servers 126 may operate to support the media devices 106 from the cloud. The structural and functional aspects of the system servers 126 may wholly or partially exist in the same or different ones of the system servers 126. In some embodiments, the system servers 126 may be configured to retrieve content item metadata from metadata sources 138 through 140 and store it to the one or more content servers 120, or may store it locally within the one or more system servers 126. The retrieval and collection of metadata elements in this fashion may result in a redundancy of metadata elements, where multiple different versions of a metadata element are retrieved and stored for a single content item. As described above, and in greater detail below, this redundancy may be addressed through deduping. The retrieval and collection of metadata elements in this fashion may also result in acquisition of poor-quality metadata unsuitable for display to the GUI shown on display device 108. As described above, and in greater detail below, poor-quality metadata may be detected through evaluation by the one or more system servers 126. System servers 126 may report instances of poor-quality metadata to metadata sources 138 through 140 and/or content servers 120, in effect serving notice of rejection of the metadata, which can prompt third-party metadata suppliers to improve their metadata or refund portions of the cost of provided metadata, as examples.

The media devices 106 may exist in thousands or millions of media systems 104. Accordingly, the media devices 106 may lend themselves to crowdsourcing embodiments and, thus, the system servers 126 may include one or more crowdsource servers 128. For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear, or when a foreign language is used), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie, based on the similarity/overlap information collected from the thousands or millions of media systems 104.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108. In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the verbal command of the user 132. The audio command processing module 130 may then forward the recognized verbal command back to the media device 106 for processing.

Figure 2:
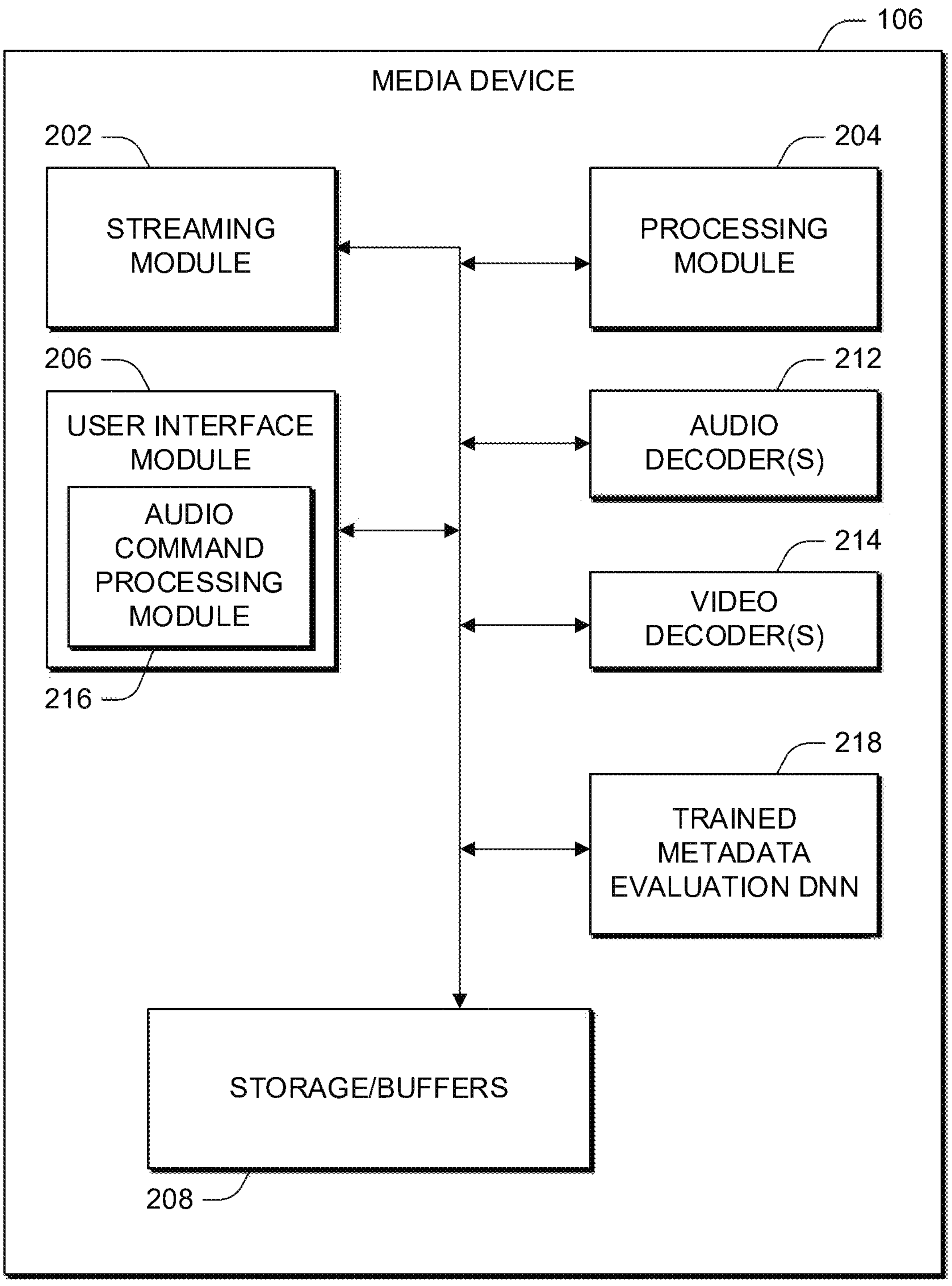
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

The system servers 126 may also include a content recommendation engine 133 that can include or implement one or more content recommendation algorithms and/or models. The media device 106 may include a user interface module 206 (see FIG. 2) configured to generate a user interface, such as a GUI presented on display device 108, which can be configured to present recommendations for content, such as content 122 from content server(s) 120. The recommendations can be generated by content recommendation engine 133 based, for example, on target user preferences, histories, behaviors, and/or demographics; content popularity rankings or change in popularity rankings over a time period across a segment or population of users (e.g., where the segment of users is one to which the target user belongs); and/or a promotion status or value associated with a content item, which may be used to promote content on a service implemented by multimedia environment 102. As an example, the generated recommendations can be transmitted from a system server 126 to a media device 106 and displayed via the user interface, e.g., on the display device 108, in the form of lists or tiled arrangements of images (or videos or animations) as may be sourced from metadata 124 and, in some examples, corresponding accompanying text (e.g., titles or other information) as may be sourced from metadata 124 or otherwise generated as described herein.

Content recommendations can also be based on content recommendation requests from a user. For example, a user may use microphone 112 or another input to request content recommendations that meet some parameter supplied in the recommendation request. The parameter can be related to any metadata 124, as examples, one or more of genre, creator/talent, and/or year. For example, a user may provide a request utterance such as "I'm in the mood for a horror movie" or "What '80s or '90s Tom Cruise romance movies do you have available?" Audio command processing module 130 or 216 may process the recommendation request utterance, and the processed recommendation request utterance can be provided to the content recommendation engine 133 to generate one or more recommendations satisfying the parameter(s) of the recommendation request(s). In some examples, the content recommendation engine 133 may call a generative AI 136, which can include a generative AI model, such as an LLM, to further process the recommendation request utterance to obtain information useful in making recommendations.

The one or more system servers 126 may also include a metadata evaluator and deduplicator 134 configured to evaluate the quality of elements of metadata 124 associated with content items from content 122. For example, a metadata evaluator and deduplicator 134 can use a trained metadata element evaluation DNN to assign quality labels or quality scores to evaluated metadata elements. In some embodiments, the metadata evaluator and deduplicator 134 can further be configured to dedupe metadata. In some embodiments, the metadata evaluator and deduplicator 134 can dedupe metadata by selecting one metadata element from among different metadata elements of the same type for the same content item, based on evaluation labels or scores assigned to the different metadata elements by the metadata evaluator and deduplicator 134, thus choosing the selected metadata element for display on the GUI presented on display device 108. For example, after evaluating different but functionality redundant metadata elements, the metadata evaluator and deduplicator 134 can select, from among the different but functionally redundant metadata elements, the metadata element having the highest quality score.

In some embodiments, the metadata evaluator and deduplicator 134 can dedupe metadata by merging multiple metadata elements from among different metadata elements of the same type for the same content item, based on evaluation labels or scores assigned to the different metadata elements by the metadata evaluator and deduplicator 134, and providing the merged metadata element for display on the GUI presented on display device 108. For example, after evaluating different but functionally redundant metadata elements, the metadata evaluator and deduplicator 134 can select, from among the different but functionally redundant metadata elements, a plurality of metadata elements having the highest quality scores, provide the selected plurality of metadata elements to an LLM (e.g., generative AI 136) along with a prompt asking the LLM to merge the metadata elements into a single metadata element, and use the LLM output as the merged metadata element for display on the GUI presented on the display device 108.

In some embodiments, the metadata evaluator and deduplicator 134 can be configured to reject metadata evaluated as low-quality by automatically sending notice of rejection to the source of the metadata, e.g., from among metadata sources 138 through 140, e.g., from one or more third-party vendors. The notice of rejection can be configured, for example, to trigger a request for replacement metadata element(s) to replace the rejected metadata element(s).

In some embodiments, the one or more system servers 126 can evaluate and dedupe metadata retrieved from metadata sources 138 through 140 on-the-fly, e.g., in substantially real time as it is retrieved from metadata sources 138 through 140. In other embodiments, metadata can be evaluated, deduped and displayed on-the-fly as corresponding content items are loaded and displayed by the GUI on the display device 108. In some embodiments, not shown in FIG. 1, some of the functionality of the metadata evaluator and deduplicator 134 can be located within media device 106 so as to perform metadata evaluation and deduping locally. For example, a metadata element evaluation DNN can be trained by the one or more system servers 126 and then downloaded onto a media device 106 for real-time local inferencing by processing metadata elements using the trained DNN directly on the media device 106.

The multimedia environment 102 can include a generative AI 136. Generative AI 136 can include or implement one or more generative AI models which can include, in some examples, an LLM, a small language model, a multimodal model, or another type of generative AI model capable of processing (e.g., metadata 124 or metadata from metadata sources 138 through 140) or content 122 to produce asset embeddings. A multimodal model, for example, can generate asset embeddings based not on textual inputs, or not solely on textual inputs, but by using visual inputs, such as images or videos, and/or audio inputs, as an alternative to or in addition to textual inputs. The generative AI 136 can be run remotely from the media system 104, e.g., the generative AI 136 may be cloud-based. Examples of these models include OpenAI GPT-4.5, OpenAI GPT-40, OpenAI CLIP, Microsoft Florence-2, Alibaba Qwen2.5-VL, Google Gemini, Google PaliGemma, DeepSeek J anus-Pro, and Anthropic Claude. The generative AI 136 may be called by the one or more system servers 126, the media device 106, or the content server 120, e.g., via a generative AI gateway (not shown). For example, the metadata evaluator and deduplicator 134 can call the generative AI 136 to generate asset embeddings corresponding to metadata elements provided as inputs to the generative AI 136. In some embodiments, not shown in FIG. 1, the generative AI 136 can be part of (e.g., executed on) the one or more system servers 126, e.g., can be part of the metadata evaluator and deduplicator 134.

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216. The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples. As described above, in some embodiments, the media device 106 can further include a trained metadata evaluation DNN 218. The trained metadata evaluation DNN 218 can function as described above, and as described in further detail below, to evaluate metadata elements for their quality, to dedupe metadata by selecting high-quality metadata elements for display in a GUI via user interface module 206, and/or to reject low-quality metadata elements by informing the sources of the metadata elements of their rejection which can be displayed.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to pre-select, preview, and/or select content, such as a movie, TV show, music, book, application, game, etc. Different aspects of the GUI produced by interface module 206 may alter displayed information for pre-selected or previewed content. For example, the GUI may display content item metadata, such as one or more content item descriptions, as part(s) of the GUI when a content item is pre-selected or previewed. The streaming module 202 of the media device 106 may request selected content and metadata from the content server(s) 120 over the network 118. The content server(s) 120 may transmit the requested content and metadata to the streaming module 202. The media device 106 may transmit the received content and metadata to the display device 108 for playback or display to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Example Media Content Selection User Interface with Evaluated Metadata

Figure 3:
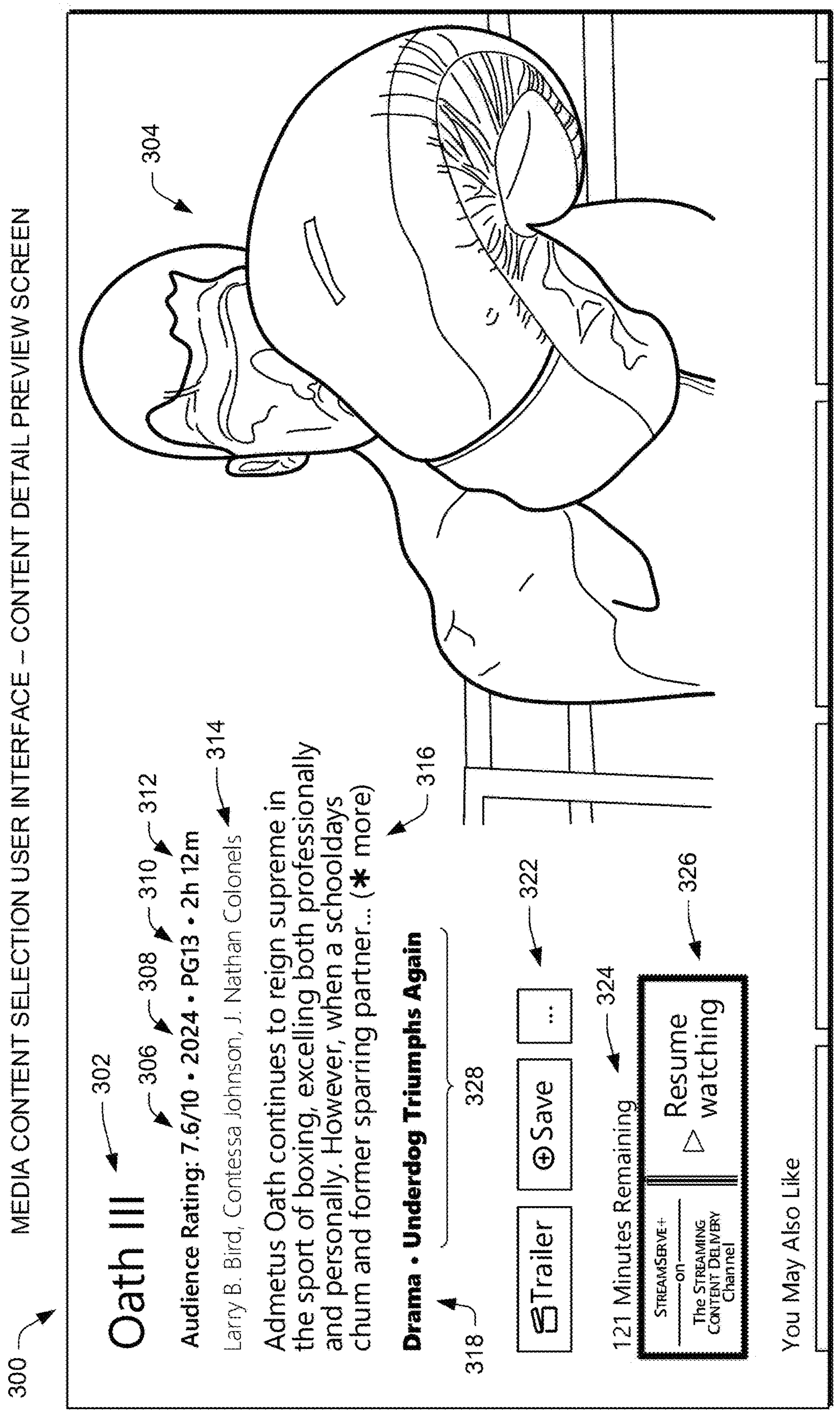
FIG. 3 illustrates an example screen of an example graphical user interface for media content selection.

FIG. 3 illustrates an example content detail preview screen 300 from an example media content selection user interface, as may be generated, for example, by user interface module 206 and displayed by display device 108 in FIG. 1. Information displayed in the example screen 300 can be sourced from metadata 124 provided from content server 120 and/or metadata sources 138 through 140, for example.

Screen 300 displays a title 302 of the previewed content item, asset artwork such as an image 304 (or animation, or video, or montage or collage of images) corresponding to the previewed content item, an audience rating 306, a year (or years) 308, a content rating 310, a runtime 312, a short list 314 of involved creators or talent, a potentially truncated version of a content item description such as a third-party-provided plot summary 316, and a genre 318. The truncated plot summary 316 can be expanded to a full plot summary, on the same screen or on a different screen, for example, by choosing an indicated control in the GUI or pressing an indicated button on the remote control 110 (an asterisk button, in the illustrated example). Screen 300 can further display an AI-generated micro-descriptor 328 that can serve as additional contextual information.

Screen 300 can further include various buttons or controls 322 that can lead to other screens or content. The illustrated example includes a button to view a trailer, a button to save the previewed content item in a list for later viewing by the user, and a button to see still more options. Screen 300 can further include a display of viewing time remaining, in examples where a user previously began and prematurely ended viewing of the content. Screen 300 can further include a button 326 to select the content (e.g., to start or resume watching the content), which, in the illustrated example, is the highlighted and default choice.

Various ones of the metadata elements displayed in example screen 300 can have been evaluated and deduplicated prior to display. For example, the short description or plot summary 316 can have been selected from among several different, functionally redundant metadata elements collected from metadata sources 138 through 140. Example methods of metadata element evaluation and deduplication are described below with regard to FIGS. 4 through 9.

Metadata Element Evaluation DNN Training

Figure 4:
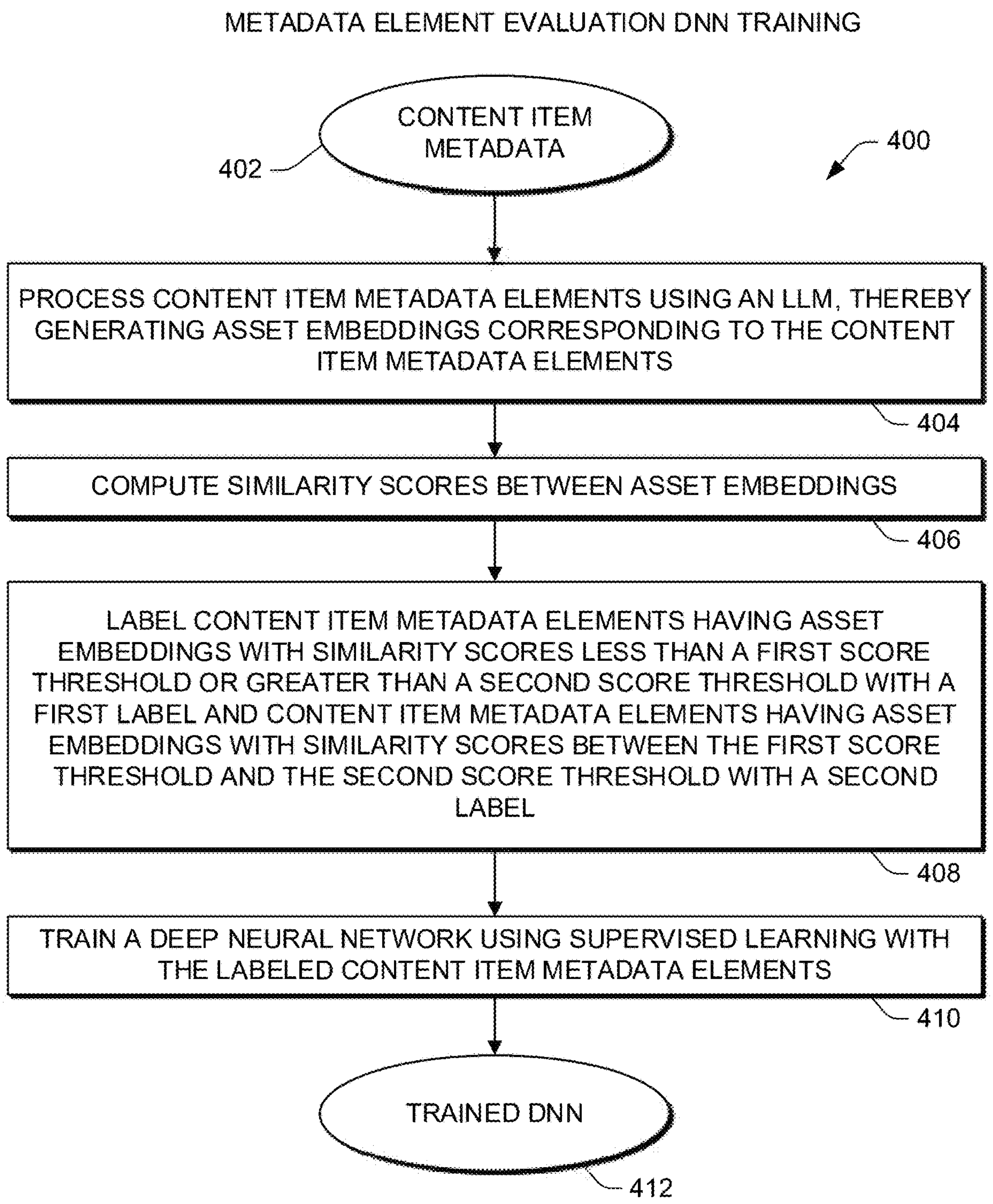
FIG. 4 illustrates an example method of training a deep neural network to perform metadata element evaluation, involving using a large language model to generate asset embeddings.

The flow diagram of FIG. 4 illustrates one example method 400 of training a DNN to perform metadata element evaluation as may be used for automated metadata deduplication or rejection in the context of content delivery service user interface generation. Method 400 can be performed by processing logic that can comprise hardware (e.g., circuitry, dedicated logic, programmable logic, microcode, etc.), software (e.g., instructions executing on a processing device), or a combination thereof. Not all steps may be needed to perform the disclosure provided herein. Further, some of the steps may be performed simultaneously, or in a different order than shown in FIG. 4. Method 400 is described with reference to FIGS. 1 and 2. The method 400 of FIG. 4 can be performed, for example, by metadata evaluator and deduplicator 134 in one or more system servers 126. However, method 400 is not limited to that example embodiment. Method 400 illustrated in FIG. 4 can be followed by method 800 in FIG. 8 to perform metadata evaluation, deduplication, and/or rejection, and can be supplemented by method 900 in FIG. 9 to improve the DNN training performed by method 400.

The input to method 400 is content item metadata 402. Content item metadata 402 can have been procured, e.g., by one or more system servers 126, e.g., from metadata sources 138 through 140 and/or from one or more content servers 120. The procured content item metadata 402 comprises a plurality of metadata elements, some of which may be functionally redundant even if different, e.g., there may be different versions of a brief description for the same content item and in the same language.

In 404, elements of the content item metadata 402 are processed using an LLM (e.g., generative AI 136 in FIG. 1) to generate asset embeddings each corresponding to the individual elements of the content item metadata 402. For example, the metadata evaluator and deduplicator 134 of FIG. 1 can call the LLM and provide the LLM with the content item metadata elements as input, along with a prompt instructing the LLM to generate an embedding for each metadata element submitted. In some examples, asset embeddings are also generated for content items themselves.

Figure 5:
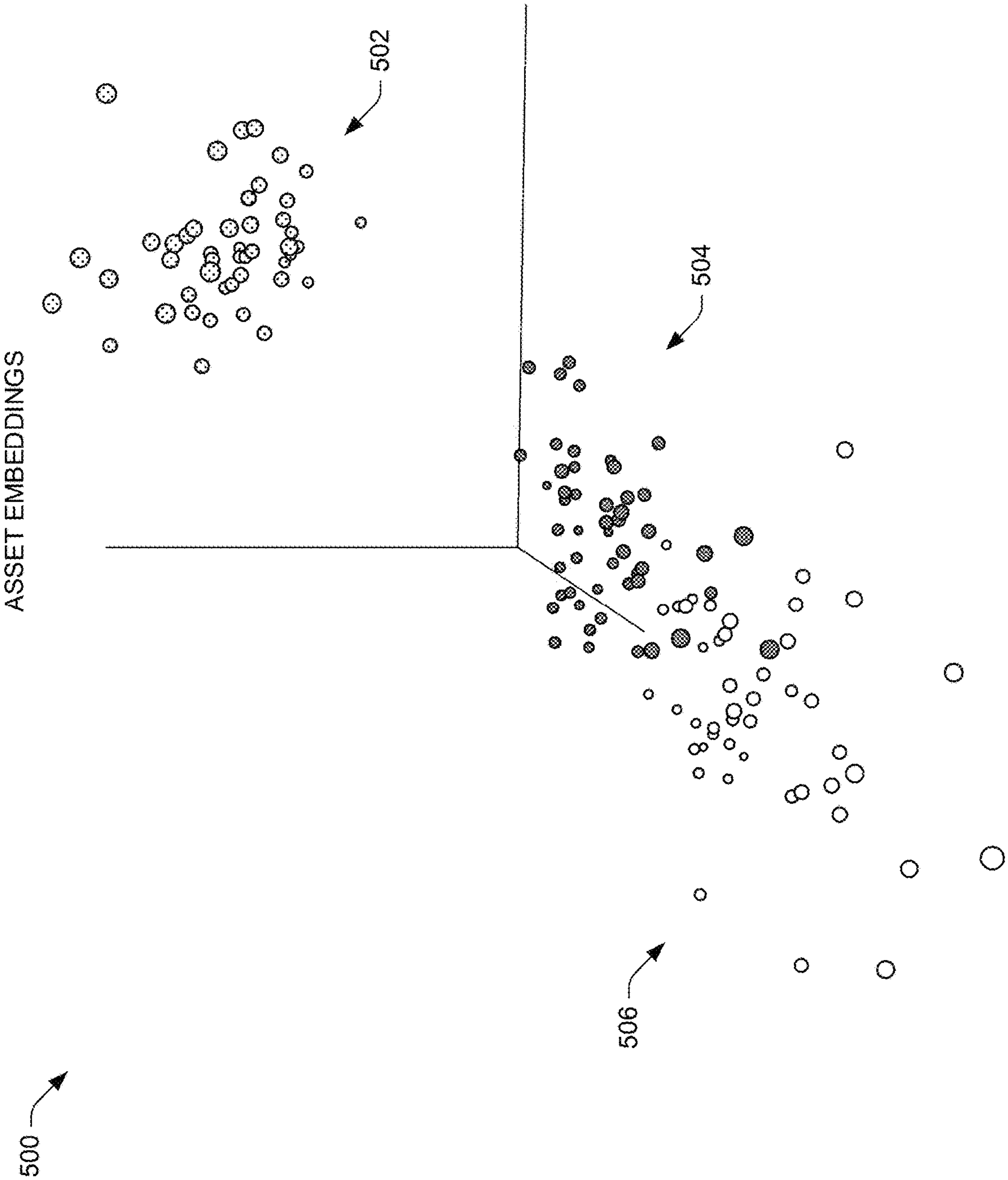
FIG. 5 illustrates example asset embeddings in an N-dimensional space.
Figure 6:
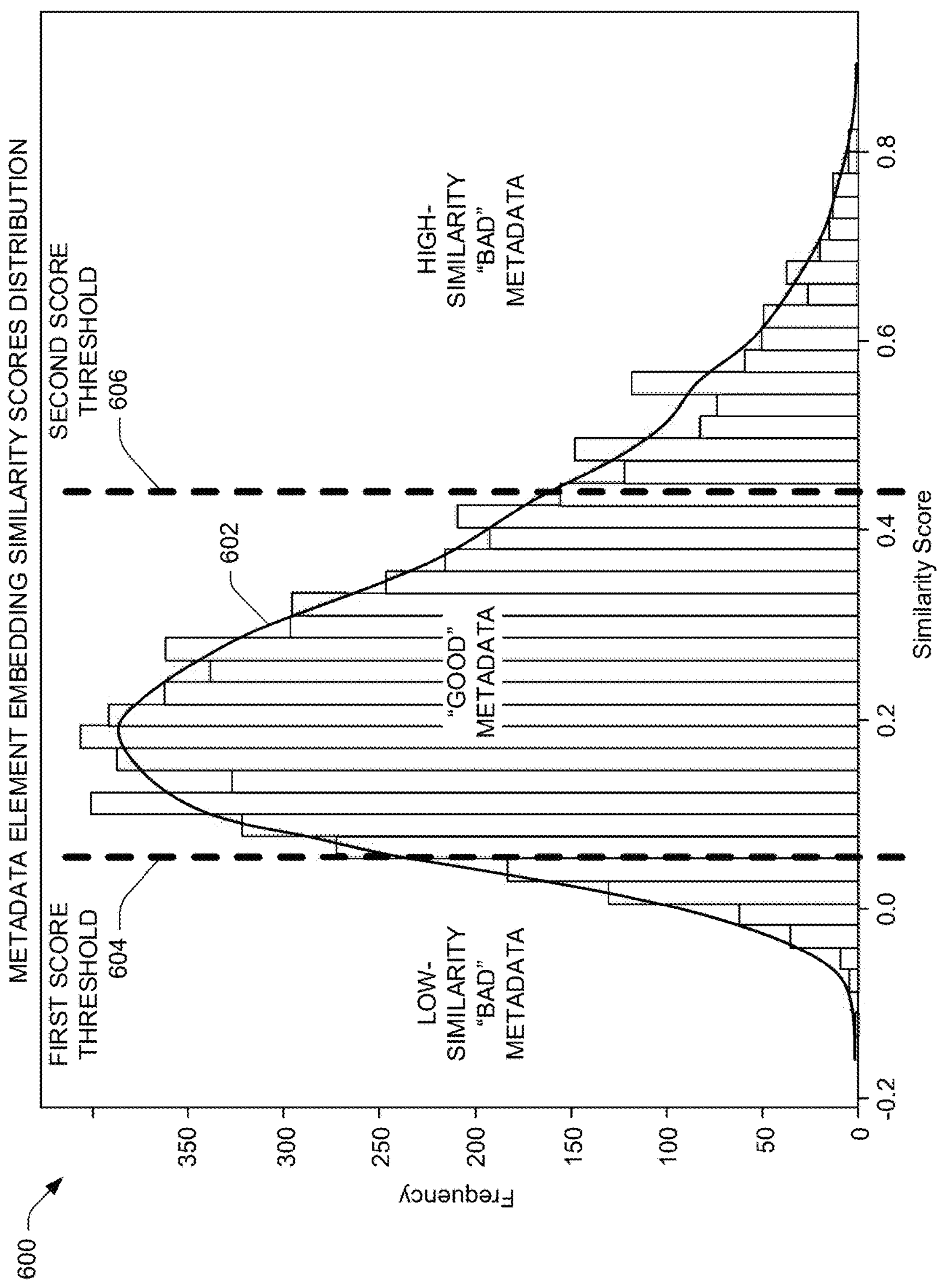
FIG. 6 illustrates an example frequency plot of asset embeddings binned by similarity score.

FIG. 5 shows example asset embeddings in an N-dimensional space 500. For purposes of illustration, the example illustrated in FIG. 5 is a three-dimensional space, but in practice, embeddings may exist in spaces of many more dimensions. In the illustrated example of FIG. 5, a first set of asset embeddings 502, shown as lightly shaded circles in the N-dimensional space 500, are generated for a first metadata type (e.g., brief description), a second set of asset embeddings 504, shown as darkly shaded circles in the N-dimensional space 500, are generated for a second metadata type (e.g., title), and a third set of asset embeddings 506, shown as unshaded circles in the N-dimensional space 500, are generated for a third metadata type (e.g., asset artwork).

With reference again to FIG. 4, in 406, similarity scores are computed between asset embeddings in pairs of the LLM-generated asset embeddings, where both metadata elements, to which the asset embeddings in an asset embedding pair correspond, are associated with the same content item. For example, similarity scores can be computed between brief description embeddings 502 and corresponding title embeddings 504 for a number of different content items. One member of the pair of asset embeddings used to compute a similarity score can be treated as a "ground truth" member to which the other member is compared. For example, a title embedding may be treated as the ground truth member and a brief description embedding, corresponding to a metadata element of the same content item, may be treated as the comparison member. In other examples, where content item embeddings are available, the content item embeddings may be treated as the ground truth members of the similarity comparison asset embedding pairs. Each similarity score can be computed as a Euclidean distance between two asset embeddings or as a cosine similarity of two asset embeddings, as examples. The similarity scores can represent the relevancy of one metadata element to another metadata element, or to the corresponding content item itself, where the content item is used to generate the asset embedding. The similarity scores can be computed, for example, by the metadata evaluator and deduplicator 134 of FIG. 1.

In 408, content item metadata elements 402 having asset embeddings with similarity scores less than a first score threshold or greater than a second score threshold are labeled with a first label (e.g., "bad" or "0") and content item metadata elements having asset embeddings with similarity scores between the first score threshold and the second score threshold are labeled with a second label (e.g., "good" or "1"). Each metadata element 402 processed in 404 can thus be assigned a corresponding binary label. The assigned labels can be useful in supervised learning approaches to training machine-learning models.

In effect, the two score thresholds can bound between them "good" metadata elements and exclude on either side of them "bad" metadata elements when the similarity scores corresponding to the metadata elements are binned by frequency. As shown in the example frequency plot 600 of FIG. 6, such frequency binning of the computed similarity scores can result in an approximate bell curve distribution 602 when plotted. The first and second score thresholds, shown as first score threshold 604 and second score threshold 606 in the example of FIG. 6, can be set using statistical methods, heuristic methods, or, as described in greater detail below with reference to FIG. 9, agentic methods using an AI agent to optimize the score threshold values. Examples of statistical methods for setting the threshold values include standard deviations (e.g., Z-scores) and interquartile range (IQR). Examples of heuristic methods for setting the threshold values include guess-and-check approaches, in which threshold values are manually set and adjusted through experimentation.

The use of both low and high thresholds, rather than only a low threshold, has the effect of labeling as "bad" the outlier metadata with similarity score outliers at either end of the similarity spectrum, rather than just the outlier metadata at the low end of the similarity spectrum. Although it may be intuitive that outlier metadata elements yielding low similarity scores should be categorized as "bad" metadata, because low similarity between metadata types can imply that the metadata queried for comparison must be of low quality to not well match the ground truth asset to which it is compared, it is not so intuitive that metadata elements yielding high similarity scores should also be categorized as "bad" metadata. In an example where the similarity scores reflect the similarity of a content item brief description to a content item title, metadata elements yielding high similarity scores may be properly categorized as "bad" metadata where, for example, a brief description of the content item provides little or no information beyond that provided in the title of the content item, as may be the case, for example, where the content item brief description and the content item title are identical or nearly identical. A brief description that is no more than, or little more than, a title would be considered unhelpful in the context of media content selection user interface because it would not provide a user additional information about the content item beyond what is given in the title, and thus would not serve to help further inform the user's decision-making process about what content item to consume. Accordingly, it can be advantageous to employ both low and high similarity score thresholds in method 400.

In 410, a DNN is trained using supervised learning with the labeled content item metadata elements, resulting in a trained DNN 412 as the product of method 400. The DNN training in 410 can, for example, employ backpropagation to iteratively adjust weights and biases of the DNN to minimize the difference between predicted and actual outputs. This minimization can be achieved, for example, by calculating a gradient of a loss function with respect to each weight and using the calculated gradient to update the weights.

Figure 7:
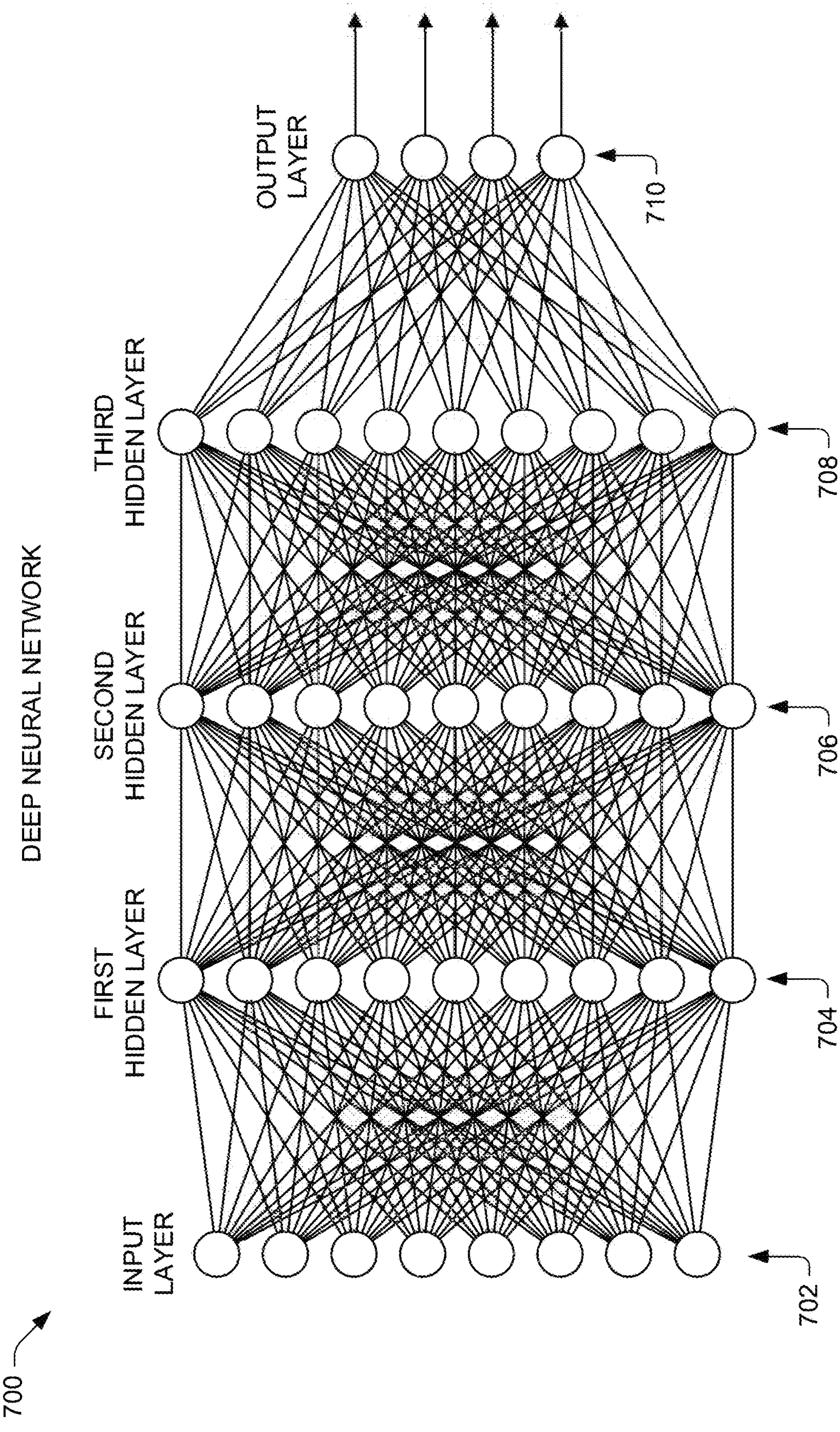
FIG. 7 illustrates an example deep neural network as may be trained to evaluate metadata elements for quality.

The diagram of FIG. 7 shows an example five-layer DNN 700 having an input layer 702, first hidden layer 704, second hidden layer 706, third hidden layer 708, and output layer 710. Each of the hidden layers has nine neurons in the example DNN 700 shown in FIG. 7. DNNs of other configurations, with different numbers of layers or neurons, may be used as the trained DNN 412 in different embodiments. Once trained, the DNN 412 can be capable of evaluating the quality of a metadata element, even for novel metadata elements for content items produced after the training cutoff date of the LLM used in the DNN training process 400.

Depending on the training employed, the DNN 412 can be configured to output a binary label for an input metadata element or corresponding embedding thereof (e.g., "bad" of "good") or a graduated numeral score (e.g., a number between 0 and 5, between 0 and 10, or between 0 and 100). In some embodiments, different individual DNNs can be trained to evaluate different metadata types, such that one DNN may be used to evaluate brief descriptions and another DNN may be used to evaluate asset artwork, as examples. In some embodiments, one multi-headed DNN can be trained to evaluate multiple different metadata types. For example, asset artwork metadata and trailer video metadata can be evaluated together as a combined, multitask objective of a single multi-headed DNN trained on both labeled asset artwork and labeled trailer video data. As described above, in some embodiments, the trained DNN 412 can be provided to a media device 106 to serve as trained metadata evaluation DNN 218 for local inferencing.

Novel Metadata Element Evaluation Using a Trained Evaluation DNN

Figure 8:
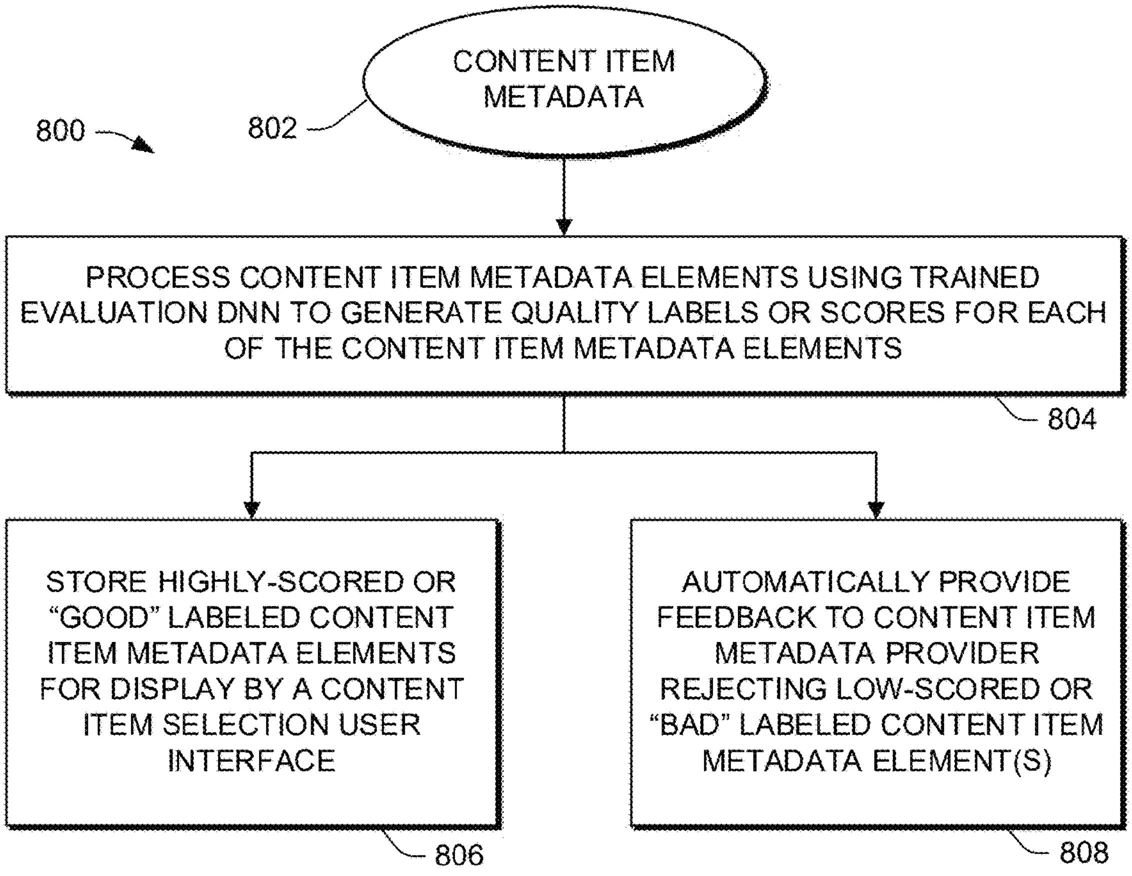
FIG. 8 illustrates an example method of metadata element evaluation using a trained evaluation DNN.

The flow diagram of FIG. 8 illustrates an example method 800 for automated content item metadata evaluation using a trained evaluation DNN, such as the DNN 412 provided as the product of method 400 of FIG. 4. The method 800 can be performed, for example, by metadata evaluator and deduplicator 134 of FIG. 1 or, in some embodiments, using trained metadata evaluation DNN 218 of FIG. 2. Content item metadata 802 can be provided as the input to method 800. M method 800 can use the same one or more computer processors used to train the DNN, as in method 400 of FIG. 4, or can use different one or more computer processors.

In 804, content item metadata elements are processed using a trained content item metadata evaluation DNN to generate quality labels or scores for each of the content item metadata elements. As described above, the quality labels can be binary (e.g., signifying "good"/"bad") or can be a more graduated numerical quality score (e.g., "4.5" out of 5.0).

Where deduping is desired, in 806, content item metadata elements that are labeled "good" or that otherwise meeting a threshold quality score can be selected and stored to a data store (e.g., in one of system server(s) 126 or content servers 120 of FIG. 1) for display by a content item selection user interface (e.g., as rendered by media device 106 in FIG. 1). Additionally or alternatively, where rejection of low-quality metadata is desired, in 808, feedback can be automatically provided to a content item metadata provider, giving notice of the rejection of content item metadata elements labeled as "bad" or otherwise falling below the threshold quality score. The metadata rejection notice can take the form of an electronic message sent over the internet, e.g., using an application programming interface (API) provided by the metadata provider for such purpose, or by email or other messaging platform.

Agentic AI-Based Setting of Quality Score Thresholds Used in DNN Training

Figure 9:
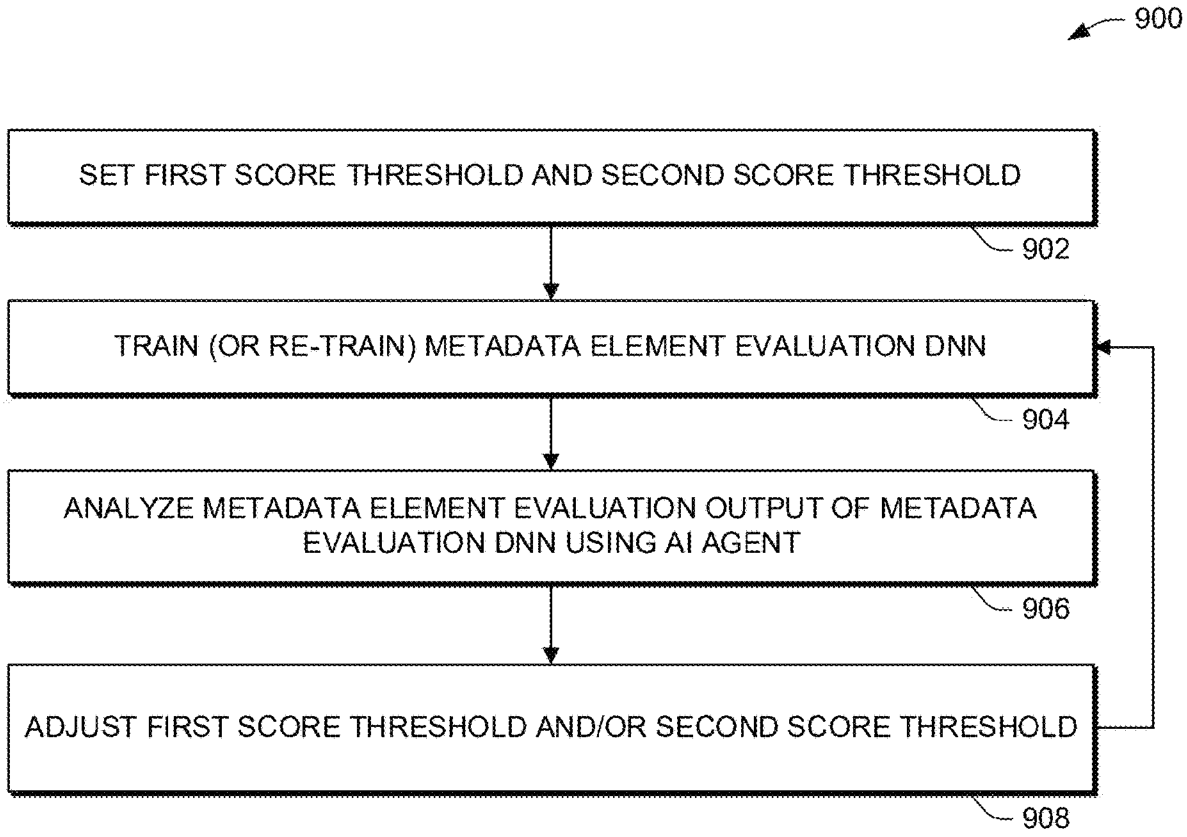
FIG. 9 illustrates an example method of setting quality score thresholds for training of a deep neural network using agentic artificial intelligence.

The flow diagram of FIG. 9 illustrates an example method 900 of using agentic AI to set quality score thresholds for training of a deep neural network to perform content item metadata element evaluation. Method 900 can therefore be used in conjunction with method 400 of FIG. 4 to optimize or improve the first and second score thresholds, such as thresholds 604 and 606 shown in the example frequency plot 600 of FIG. 6.

A genetic AI uses one or more AI agents to hone in on a goal by autonomously making decisions and taking actions based on a defined objective, utilizing, for example, LLMs or other AI systems or techniques to analyze data, adapt to new information, and refine its actions to improve performance of a task. A genetic AI systems can make decisions and take actions independently, without constant human intervention, enabling them to adapt to changing circumstances and optimize their approach to achieve a desired outcome. A genetic AI can, for example, use reinforcement learning to improve task performance by performing interactions (e.g., adjusting the value of some variable or variables of interest), receiving feedback, including at least one reward/penalty signal, based on these interactions, and then adjusting its behavior in future iterations of the interactions to maximize cumulative rewards over time. In the example method 900 of FIG. 9, agentic AI can be used to iteratively optimize or improve the values of the first score threshold and the second score threshold used in 408 of metadata element evaluation DNN training method 400, in effect by iteratively performing training experiments that would otherwise be performed by human repetition and observation.

In 902, an AI agent can set the first score threshold and the second score threshold, or these thresholds can be pre-set prior to the operation of the AI agent. As examples, the first and second score thresholds can be set randomly; in accordance with a statistical method, as described above; in accordance with default programmed values; or by human judgment.

In 904, the AI agent can trigger the training of a metadata element evaluation DNN. For example, the AI agent can trigger a method like that of method 400, as described above, to train a DNN to perform metadata evaluation, using the first and second score thresholds set in 902. Because the values of the first and second score thresholds affect the labeling of metadata used to train the DNN, the values of the first and second score thresholds set in 902 will affect the training of the DNN and thus the performance of the trained DNN.

In 906, the AI agent can analyze the metadata element evaluation output of the trained DNN. For example, the AI agent can use the DNN trained in 904 to evaluate the quality of metadata (e.g., metadata not used in the training in 904) and can compare the trained DNN metadata quality assessments with its own independently generated assessments made using an LLM. The degree to which the two assessments match can inform the value of a reward/penalty signal.

In 908, the AI agent can adjust the first score threshold and/or the second score threshold. For example, the adjustment of the first score threshold and/or the second score threshold in 908 can be informed by the reward/penalty signal and by reward/penalty values computed in previous iterations of method 900, if any. The AI agent can then re-trigger the metadata element evaluation DNN, repeating the training in 904 for the adjusted first score threshold and/or second score threshold, the DNN output analysis in 906, and the threshold adjustment in 908 in an iterative loop. The AI agent can terminate the iterative loop of method 900 and settle on final values of the first score threshold and the second score threshold based on one or more termination criteria. The termination criteria can include, as examples, total time used in performing method 900, computing resources expended in performing method 900, and/or amount of DNN performance improvement achieved with successive iterations of method 900. For example, the AI agent can recognize when small adjustments to the first score threshold and/or the second score threshold provide diminishing returns in improvement, or yield no improvement, to DNN performance according to the analysis performed in 906, and can terminate the loop based on this recognition. Where, as described above, different specialized DNNs are trained for evaluating different metadata types, the first and second score thresholds can be set differently for each different DNN, and the method 900 can be performed independently to improve or optimize the first and second score thresholds for each different DNN trained.

Content Delivery Service Platform Safety Improvement

Embodiments as described herein can have a number of benefits and advantages. Embodiments can automate data quality evaluation processes and can reduce or eliminate manual human administrator intervention in such processes. As described above, based on the trained DNN determining that an element of content-item-related metadata (e.g., asset artwork, a trailer, or a set of subtitles) is of bad quality, embodiments can prevent the determined-bad element from being publicly provided to users of the platform. Also as described above, embodiments can also automatically demand replacements and/or refunds for bad-quality metadata, e.g., in instances where the metadata are provided by third-party vendors.

Additionally, embodiments can improve platform safety by improving the quality of rating and genre metadata associated with content items available on a content delivery service's platform. Platform safety, in this context, refers to the ability of users to confidently use the platform with assurance that they will not be induced to consume or otherwise be exposed to content items that do not match general community standards or individual user preferences. As one example, platform safety can include parents or guardians of children being able to trust that a child account on the content delivery service platform will not provide access to mature-rating content, such as R-rated content. As another example, platform safety can include ensuring users who have explicitly or implicitly indicated aversion to certain content as may be advised of in content warnings (e.g., adult language, nudity, violence, smoking) are not induced to consume content having the indicated-aversion content warnings. Assuring platform safety can involve ensuring the accuracy and quality of content rating and content warning metadata. If content ratings and/or content warnings are missing, wrong, vague, or misleading, platform safety and, consequently, the brand image of the content delivery service may be negatively impacted. Accordingly, one or more DNNs can be trained as described herein to automatically evaluate the quality of content rating and/or content warning metadata to ensure its accuracy and thus to better assure platform safety. As one example, embodiments can implement a DNN trained as described above (e.g., using method 400) to evaluate content item metadata elements for safety. For example, the DNN can be trained to generate quality labels or scores for content item metadata elements indicative of unsafe metadata elements. For example, the DNN can assign labels or scores to metadata elements indicative of the metadata elements including explicit language or explicit multimedia content, e.g., language content or video and/or audio content unsuitable for children. Systems and methods can flag metadata content deemed unsafe for human review, or can automatically discard or report such metadata, as described above.

As another example, a platform that may otherwise choose, for platform safety reasons, not to make unrated content available to its users can implement a DNN trained as described above (e.g., using method 400) to evaluate content items for safety. Based on the trained neural network deeming with high confidence that an unrated content item is safe (e.g., would have a rating below a threshold content rating, e.g., R or below or PG-13 or below), the embodiment can flag the content item for review by a human content management team (if required) or can directly deem the content item fit to provide on the platform, notwithstanding the lack of associated content rating, and thus can automatically adjust a setting that makes the content item available to users on the platform.

As another example, based on a content item having a particular content rating (e.g., PG-13) as metadata when onboarded to the platform, but trained DNN deeming the content to be unsafe (e.g., exceeding a content rating threshold, such as PG-13), the implementation can flag the content item for review by the human content management team before the content item is publicly provided by the platform, or the embodiment can directly deem the content item unfit to provide on the platform, and thus can automatically adjust a setting that makes the content item available to users on the platform. A reasoning model can be used to explain why a certain prediction is made to aid human reviewers.

In still other examples, in which short-form video clips are extracted from long-form content, embodiments can implement a DNN trained as described above (e.g., using method 400) to evaluate short-form content items for safety when metadata associated with the corresponding source long-form content items is indicative of unsafe content, and/or to associate with extracted short-form content metadata different from the metadata associated with the source long-form content. For example, a kid-safe short-form video clip (e.g., a short-form video clip having no child-inappropriate video, audio, or textual content, that would be, for example, G-rated or PG-rated if rated on its own) may be extracted from an R-rated movie. Simply associating existing metadata from the source long-form content item with the extracted short-form content item may result in unsafe metadata being assigned to kid-safe short-form content, or metadata being associated with the kid-safe short-form content erroneously indicating that the short-form content is unsafe. For example, where the metadata associated with the source long-form content includes a content rating, an R rating from a long-form movie may be assigned to a safe, child-suitable clip extracted from the source long-form movie. Accordingly, rather than borrow metadata from source long-form content to associate with extracted short-form content, embodiments can implement a DNN trained as described above (e.g., using method 400) to evaluate source long-form content associated metadata elements with respect to the extracted short-form content items, and to thereby flag for correction or filling from a different source any source long-form content item metadata deemed by the DNN to correspond poorly to the extracted short-form content.

The embodiments described herein can thus help to safeguard the brand image of the content delivery service, in addition to improving content selection user interfaces.

Example Computer System

Figure 10:
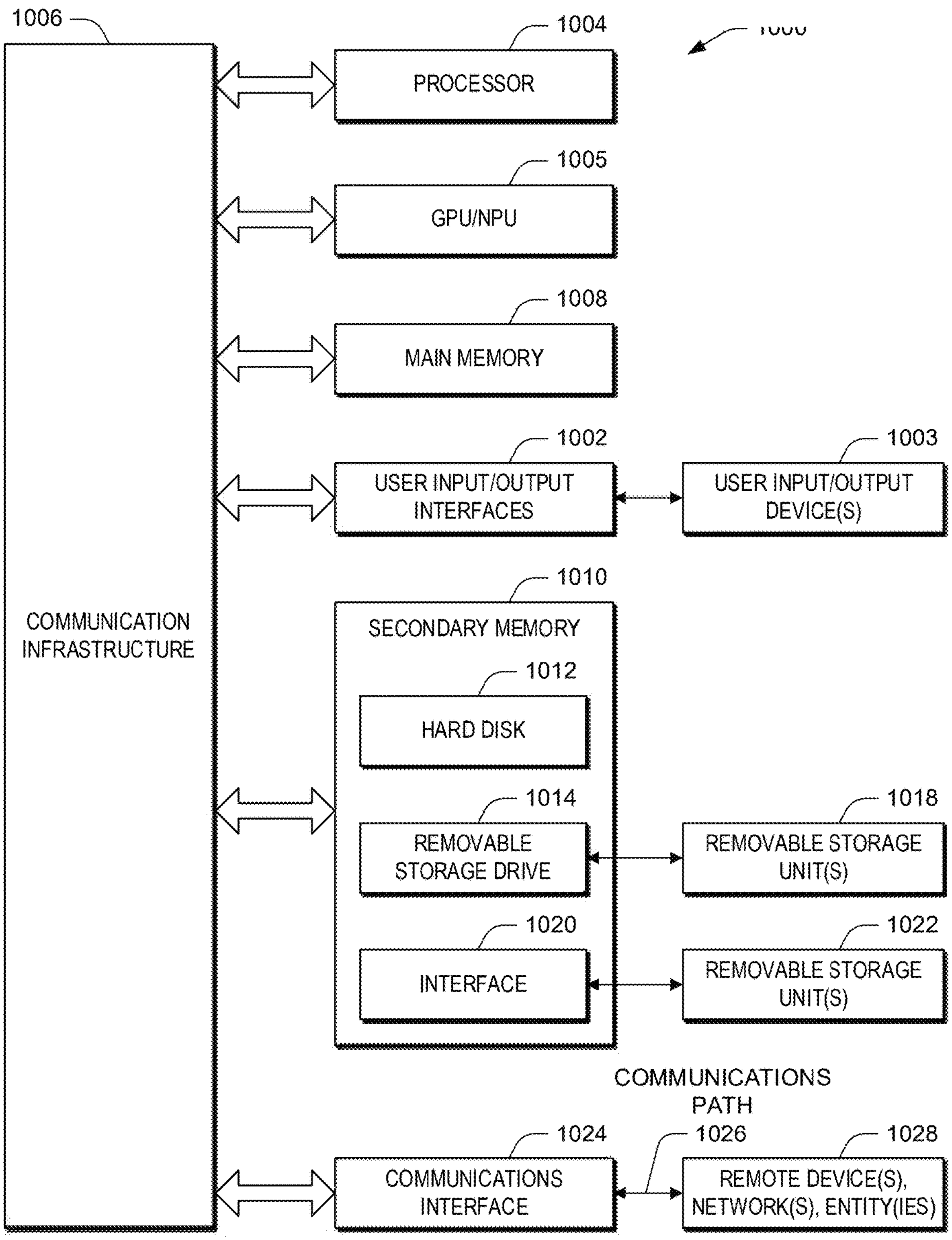
FIG. 10 illustrates an example computer system useful for implementing various embodiments.

Various embodiments may be implemented, for example, using one or more well-known computer systems, such as computer system 1000 shown in FIG. 10. For example, the media device 106, one or more system servers 126, and/or one or more content servers 120 may be implemented using combinations or sub-combinations of computer system 1000. One or more computer systems 1000 may be used to perform methods 400, 800, and/or 900. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. The computer system 1000 can also include one or more GPUs and/or NPUs 1005. In an embodiment, a GPU or an NPU may be a processor that is a specialized electronic circuit designed to process mathematically intensive applications. The GPU or NPU may have a parallel structure that is efficient for parallel processing of large blocks of data, such as mathematically intensive data common to computer graphics applications, images, videos, AI models, etc. Both GPUs and NPUs can be used to process AI data, such as inferencing using AI models, faster than a CPU alone. Processor 1004 and/or GPU/NPU 1005 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smartphone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premises" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Y et Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

Incorporating automatic evaluation of metadata quality into a content delivery service platform as described herein can improve a media content selection GUI, and can provide various technical and user-centric benefits and advantages of the GUI. The automatic evaluation as described herein can leverage state-of-the-art LLM-based processing, including by using the latest third-party-provided LLMs, while avoiding disadvantages associated with LLM training cutoff dates by training a DNN to perform the evaluation based on LLM outputs. In addition to the improvements to the technical field of media content selection graphical user interfaces described above, benefits and advantages include attracting more users to sign up and engage with content items, lowering users' focus-to-click rate, increasing users' click-to-stream rate, and reducing user steps to access content details. M ore accurate metadata can provide better content item context on a content details page, boosting content item streaming hours or content item downloads and content delivery service platform monetization. Furthermore, automating deduplication of metadata and/or rejection notification of bad-quality metadata can reduce content delivery service costs. Still further, trained content item metadata element quality evaluation DNNs, as described herein, can be used to ensure platform safety, which can further drive user adoption of and loyalty to a content delivery service platform.

The Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for evaluating content item metadata elements for use in a content selection graphical user interface (GUI), comprising:

processing, with at least one computer processor, the content item metadata elements using a deep neural network (DNN) trained to generate quality labels or scores for each of the content item metadata elements, wherein training of the DNN with the at least one computer processor or another at least one computer processor comprises:

processing training metadata elements using a large language model (LLM), thereby generating asset embeddings corresponding to the training metadata elements;

computing similarity scores between pairs of the asset embeddings;

labeling ones of the training metadata elements having asset embeddings with similarity scores less than a first score threshold or greater than a second score threshold with a first label and ones of the training metadata elements having asset embeddings with similarity scores between the first score threshold and the second score threshold with a second label; and training the DNN to perform the generation of the quality labels or scores, the training using supervised learning with the labeled training metadata elements.

2. The computer-implemented method of claim 1, further comprising:

deduplicating different ones of the content item metadata elements that are of the same type and for the same content item.

3. The computer-implemented method of claim 2, wherein the deduplicating comprises:

selecting a single one of the content item metadata elements, from among the ones of the content item metadata elements that are of the same type and for the same content item, based on the quality labels or scores generated by the DNN for the ones of the content item metadata elements that are of the same type and for the same content item.

4. The computer-implemented method of claim 2, wherein the deduplicating comprises:

selecting a plurality of the content item metadata elements, from among the ones of the content item metadata elements that are of the same type and for the same content item, based on the quality labels or scores generated by the DNN for the ones of the content item metadata elements that are of the same type and for the same content item; and providing the plurality of the content item metadata elements to the LLM or another LLM with a prompt instructing merger of the plurality of the content item metadata elements into a merged content item metadata element.

5. The computer-implemented method of claim 2, wherein the deduplicating provides deduplicated content item metadata elements, and wherein the computer-implemented method further comprises:

storing the deduplicated content item metadata elements to a data store; and displaying at least one of the deduplicated content item metadata elements, as stored in the data store, on the content selection GUI.

6. The computer-implemented method of claim 1, further comprising:

based on the processing the content item metadata elements generating quality labels or scores indicative of unacceptable quality for one or more of the content item metadata elements, automatically providing electronic notice to a content item metadata provider rejecting the one or more of the content item metadata elements.

7. The computer-implemented method of claim 1, wherein at least one of the first score threshold or the second score threshold is determined by an artificial intelligence (AI) agent configured to analyze metadata element evaluation output of the processing the content item metadata elements using the DNN and to adjust the first score threshold or the second score threshold based on the analyzing the metadata evaluation output.

8. A system for evaluating content item metadata elements for use in a content selection graphical user interface (GUI), comprising:

one or more memories; and at least one processor each coupled to at least one of the memories and configured to perform operations comprising:

processing the content item metadata elements using a deep neural network (DNN) trained to generate quality labels or scores for each of the content item metadata elements, wherein training of the DNN with the at least one processor or another at least one processor comprises:

processing training metadata elements using a large language model (LLM), thereby generating asset embeddings corresponding to the training metadata elements;

computing similarity scores between pairs of the asset embeddings;

labeling ones of the training metadata elements having asset embeddings with similarity scores less than a first score threshold or greater than a second score threshold with a first label and ones of the training metadata elements having asset embeddings with similarity scores between the first score threshold and the second score threshold with a second label; and training the DNN to perform the generation of the quality labels or scores, the training using supervised learning with the labeled training metadata elements.

9. The system of claim 8, wherein the operations further comprise:

deduplicating different ones of the content item metadata elements that are of the same type and for the same content item.

10. The system of claim 9, wherein the deduplicating comprises:

selecting a single one of the content item metadata elements, from among the ones of the content item metadata elements that are of the same type and for the same content item, based on the quality labels or scores generated by the DNN for the ones of the content item metadata elements that are of the same type and for the same content item.

11. The system of claim 9, wherein the deduplicating comprises:

selecting a plurality of the content item metadata elements, from among the ones of the content item metadata elements that are of the same type and for the same content item, based on the quality labels or scores generated by the DNN for the ones of the content item metadata elements that are of the same type and for the same content item; and providing the plurality of the content item metadata elements to the LLM or another LLM with a prompt instructing merger of the plurality of the content item metadata elements into a merged content item metadata element.

12. The system of claim 9, wherein the deduplicating provides deduplicated content item metadata elements, and wherein the operations further comprise:

storing the deduplicated content item metadata elements to a data store; and displaying at least one of the deduplicated content item metadata elements, as stored in the data store, on the content selection GUI.

13. The system of claim 8, wherein the operations further comprise:

based on the processing the content item metadata elements generating quality labels or scores indicative of unacceptable quality for one or more of the content item metadata elements, automatically providing electronic notice to a content item metadata provider rejecting one or more of the content item metadata elements having quality labels or scores indicative of unacceptable quality.

14. The system of claim 8, wherein at least one of the first score threshold or the second score threshold is determined by an artificial intelligence (AI) agent configured to analyze metadata element evaluation output of the evaluation and to adjust the first score threshold or the second score threshold based on the analyzing the metadata evaluation output.

15. A non-transitory computer-readable medium having instructions stored thereon that, when executed by at least one computing device, cause the at least one computing device to perform operations for evaluating content item metadata elements for use in a content selection graphical user interface (GUI), the operations comprising:

processing the content item metadata elements using a deep neural network (DNN) trained to generate quality labels or scores for each of the content item metadata elements, wherein training of the DNN with the at least one computing device or another at least one computing device comprises:

processing training metadata elements using a large language model (LLM), thereby generating asset embeddings corresponding to the training metadata elements;

computing similarity scores between pairs of the asset embeddings;

labeling ones of the training metadata elements having asset embeddings with similarity scores less than a first score threshold or greater than a second score threshold with a first label and ones of the training metadata elements having asset embeddings with similarity scores between the first score threshold and the second score threshold with a second label; and training the DNN to perform the generation of the quality labels or scores, the training using supervised learning with the labeled training metadata elements.

16. The non-transitory computer-readable medium of claim 15, wherein the operations further comprise:

deduplicating different ones of the content item metadata elements that are of the same type and for the same content item.

17. The non-transitory computer-readable medium of claim 16, wherein the deduplicating comprises:

selecting a single one of the content item metadata elements, from among the ones of the content item metadata elements that are of the same type and for the same content item, based on the quality labels or scores generated by the DNN for the ones of the content item metadata elements that are of the same type and for the same content item.

18. The non-transitory computer-readable medium of claim 16, wherein the deduplicating comprises:

selecting a plurality of the content item metadata elements, from among the ones of the content item metadata elements that are of the same type and for the same content item, based on the quality labels or scores generated by the DNN for the ones of the content item metadata elements that are of the same type and for the same content item; and providing the plurality of the content item metadata elements to the LLM or another LLM with a prompt instructing merger of the plurality of the content item metadata elements into a merged content item metadata element.

19. The non-transitory computer-readable medium of claim 16, wherein the deduplicating provides deduplicated content item metadata elements, and wherein the operations further comprise:

storing the deduplicated content item metadata elements to a data store; and displaying at least one of the deduplicated content item metadata elements, as stored in the data store, on the content selection GUI.

20. The non-transitory computer-readable medium of claim 15, wherein the operations further comprise:

based on the processing the content item metadata elements generating quality labels or scores indicative of unacceptable quality for one or more of the content item metadata elements, automatically providing electronic notice to a content item metadata provider rejecting one or more of the content item metadata elements having quality labels or scores indicative of unacceptable quality.

* * * * *